(12) United States Patent
Chang et al.

(10) Patent No.: US 8,326,062 B2
(45) Date of Patent: Dec. 4, 2012

(54) SYSTEM AND METHOD FOR BINARIZING A GRAY-SCALE IMAGE IN AN ELECTRONIC DEVICE

(75) Inventors: Chih-Kuang Chang, Taipei Hsien (TW); Xian-Yi Chen, Shenzhen (CN); Zhong-Kui Yuan, Shenzhen (CN); Xiao-Guang Xue, Shenzhen (CN); Yan-Li Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 659 days.

(21) Appl. No.: 12/551,683

(22) Filed: Sep. 1, 2009

(65) Prior Publication Data

US 2010/0226587 A1 Sep. 9, 2010

(30) Foreign Application Priority Data

Mar. 7, 2009 (CN) .......................... 2009 1 0300744

(51) Int. Cl.
*G06K 9/46* (2006.01)
(52) U.S. Cl. ...................................................... 382/237
(58) Field of Classification Search .................. 382/172, 382/237, 218, 274, 170
See application file for complete search history.

(56) References Cited

U.S. PATENT DOCUMENTS 6,307,962 B1 * 10/2001 Parker et al. .................. 382/170
7,298,897 B1 * 11/2007 Dominguez et al. .......... 382/172

* cited by examiner

*Primary Examiner* — Duy M Dang
(74) *Attorney, Agent, or Firm* — Altis Law Group, Inc.

(57) ABSTRACT

An electronic device includes an image processing system to binarize a gray-scale image to generate a corresponding binary image in the electronic device. Binarization of the gray-scale image by the image processing system includes generation of a binarization array to store binarization threshold values that each corresponds to a pixel of the gray-scale image, and binarization of the gray-scale image according to all binarization threshold values stored in the binarization array.

15 Claims, 4 Drawing Sheets

| P (1,1) | P (2,1) | P (3,1) | P (4,1) | P (5,1) |
| --- | --- | --- | --- | --- |
| P (1,2) | P (2,2) | P (3,2) | P (4,2) | P (5,2) |
| P (1,3) | P (2,3) | P (3,3) | P (4,3) | P (5,3) |
| P (1,4) | P (2,4) | P (3,4) | P (4,4) | P (5,4) |

FIG. 4

SYSTEM AND METHOD FOR BINARIZING A GRAY-SCALE IMAGE IN AN ELECTRONIC DEVICE

BACKGROUND

1. Technical Field

Embodiments of the present disclosure generally relate to techniques of binarizing images, and more particularly to a system and method for binarizing a gray-scale image in an electronic device.

2. Description of Related Art

An electronic device, such as a computer, a server, or a mobile phone, for example, may be utilized to binarize gray-scale images to generate binary images.

In this manner, a gray-scale image may be binarized according to a binarization threshold value. All pixels of the gray-scale image may be binarized by utilizing the binarization threshold value. This method can be imprecise, leading to incorrect binarization of the gray-scale image.

BRIEF DESCRIPTION OF THE DRAWINGS

FIG. 4 illustrates one embodiment of pixels of a gray-scale image.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
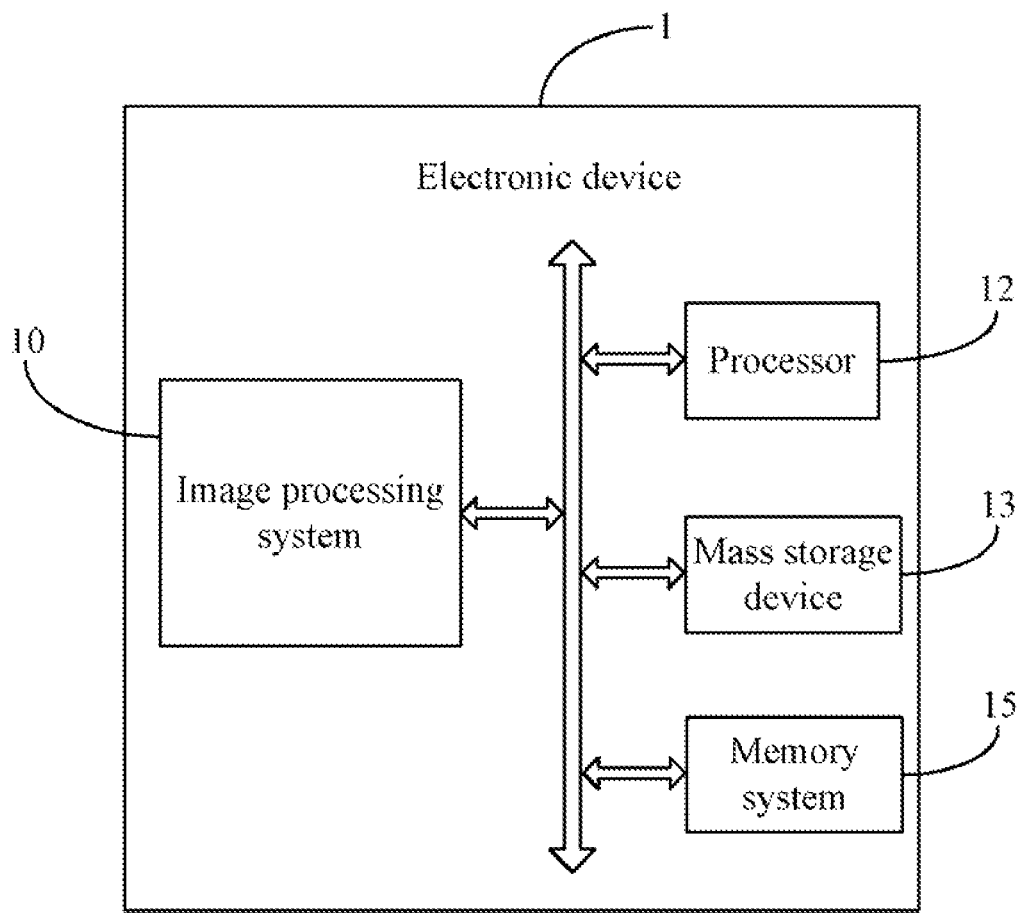
FIG. 1 is a block diagram of one embodiment of an electronic device for binarizing a gray-scale image.

FIG. 1 is a block diagram of one embodiment of an electronic device 1. The electronic device 1 may include an image processing system 10. The image processing system 10 may be used to binarize a gray-scale image in the electronic device 1. In the embodiment, the term "binarize" is defined to the operation of changing pixels of a gray-scale image to pixels of a corresponding binary image. The term "binary image" is defined to a digital image that has only two possible values ("0" and "1") for each pixel, the two possible values indicate black-and-white colors.

The electronic device 1 may be a computer, a server, a mobile phone, or a PDA (personal digital assistant), for example. In the embodiment, the electronic device 1 may include a memory system 15, such as a random access memory (RAM) for temporary storage of information and/or a read only memory (ROM) for permanent storage of information, and/or a mass storage device 13, such as a hard drive, or optical media storage device. The mass storage device 13 may comprise one or more hard disk drives, optical drive, networked drive, or some combination of various digital storage systems. In the embodiment, the mass storage device 13 may store the image processing system 10 and at least one gray-scale image to be binarized by the image processing system 10. The electronic device 1 also includes at least one processor 12 for computation. Typically, the modules in the electronic device 1 are in data communication via one or more standards-based bus system. In other embodiments, the standards-based bus system could be Peripheral Component Interconnect (PCI), Microchannel, SCSI, Industrial Standard Architecture (ISA) and Extended ISA (EISA) architectures, for example. The memory system 15 or the mass storage device 13 may include one or more function modules to implement the image processing system 10.

The electronic device 1 is generally controlled and coordinated by operating system software, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system.

Figure 2:
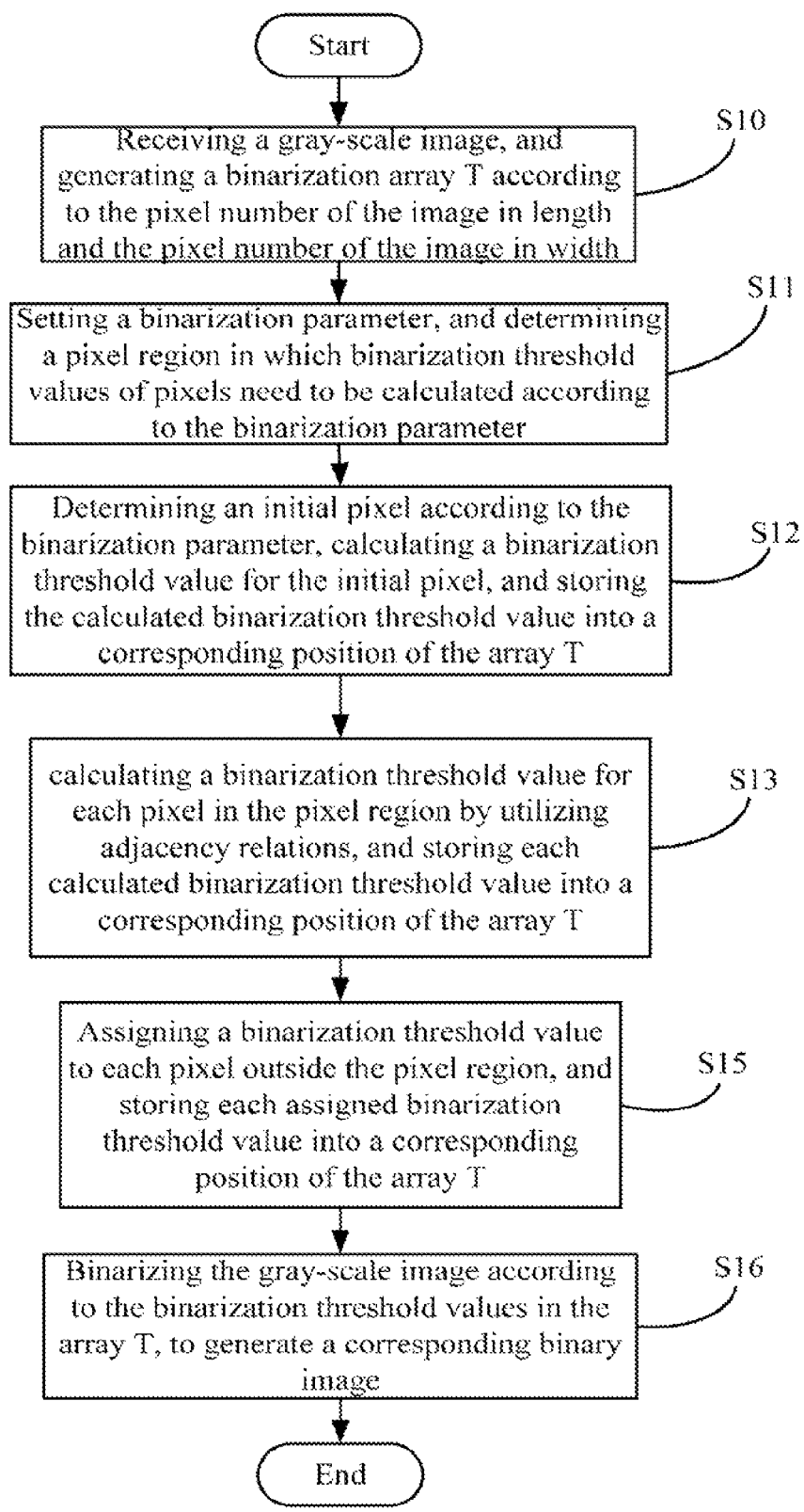
FIG. 2 is a flowchart illustrating one embodiment of a method for binarizing a gray-scale image.

FIG. 2 is a flowchart illustrating one embodiment of a method for binarizing a gray-scale image. In the embodiment, the image processing system 10 comprise one or more computerized codes that are executable by the at least one processor 12 of the electronic device 1 to perform the method. Depending on the embodiment, additional blocks in the flow of FIG. 2 may be added, others removed, and the ordering of the blocks may be changed.

In block S10, the image processing system 10 receives a gray-scale image from the mass storage device 13, and generates a binarization array (denoted as "T") according to how many pixels in length of the gray-scale image (denoted as "W") and how many pixels in width of the gray-scale image (denoted as "H"). In the embodiment, the array T is a W*H rank array. Each position of the array T is used to store a binarization threshold value that corresponds to a pixel of the gray-scale image. Each binarization threshold value stored in the array T is used to binarize a corresponding pixel of the gray-scale image. A pixel of the gray-scale image is denoted by P(i, j), where "i" indicates that the pixel is in the $i^{th}$ pixel order of the gray-scale image in length, and "j" indicates that the pixel is in the $j^{th}$ pixel order of the gray-scale image in width. For example, as shown in FIG. 4, P(3, 2) is in the third pixel order of the gray-scale image in length and the second pixel order of the gray-scale image in width.

In block S11, the image processing system 10 sets a binarization parameter (denoted as "R"), and determines a pixel region of the gray-scale image according to the binarization parameter R, each pixel in the pixel region needs to be calculated for a binarization threshold value. Details of the pixel region is described below in paragraph [0016], for example. In one embodiment, the image processing system 10 may provide a user interface, such as a graphical user interface (GUI), for a user to set the binarization parameter R. In another embodiment, the image processing system 10 may automatically set the binarization parameter R when the image processing system 10 is executed by the processor 12 of the electronic device 1.

In one embodiment, the binarization parameter R is used to define a R*R rank pixel array of the gray-scale image to calculate a binarization threshold value, which corresponds to a center pixel of the pixel array. The pixel region includes pixels that each is a center pixel of a pixel array defined by the binarization parameter R. If the binarization parameter R is equal to 3, for example, the pixel array defined by the binarization parameter R is a 3*3 rank pixel array. As shown in FIG. 4, each of P(2, 2), P(3, 2), P(4, 2), P(2, 3), P(3, 3), and P(4, 3) is a center pixel of a 3*3 rank pixel array, and is a pixel in the pixel region. For example, P(1, 2), P(2, 2), P(3, 2), P(1, 3), P(2, 3), P(3, 3), P(1, 4), P(2, 4), and P(3, 4) forms a 3*3 rank pixel array defined by the binarization parameter R. The P(2, 3) being a center pixel of the 3*3 rank pixel array, is a pixel in the pixel region, and a binarization threshold value corresponding to the P(2, 3) can be calculated by utilizing the 3*3 rank pixel array.

In block S12, the image processing system 10 determines an initial pixel according to the binarization parameter R. The image processing system 10 further calculates a binarization threshold value for the initial pixel, and stores the calculated binarization threshold value into a corresponding position of the array T. In the embodiment, the initial pixel is the first pixel in the top left corner of the pixel region, such as P(2, 2) shown in FIG. 4, for example. The method of calculating a binarization threshold value for a pixel with gray value "A" is described below, for example.

The binarization threshold value of the pixel with gray value "A" in a R*R rank pixel array, is calculated using the following formula:

$$P(A) = nA/N, \quad N = R*R, \quad \sum_{A=0}^{255} P(A) = 1,$$

wherein "P(A)" denotes the probability of the pixel with gray value "A" in the R*R rank pixel array, "nA" denotes an occurrence number of the pixel with gray value "A" in the R*R rank pixel array.

$$W1 = pr(C1) = \sum_{A=0}^{M} P(A), \quad W2 = pr(C2) = \sum_{A=M+1}^{255} P(A),$$

wherein "C1" denotes a pixel set of the gray-scale image in which each pixel has a gray value smaller than or equal to M, "C2" denotes a pixel set of the gray-scale image in which each pixel has a gray value larger than M, "W1" denotes the occupancy probability of all pixels in the pixel set C1, "W2" denotes the occupancy probability of all pixels in the pixel set C2.

$$U1 = \sum_{A=0}^{M} \frac{P(A)}{W1} \times A, \quad U2 = \sum_{A=M+1}^{255} \frac{P(A)}{W2} \times A,$$

wherein "U1" denotes a desired value of all pixels in the pixel set C1, "U2" denotes a desired value of all pixels in the pixel set C2.

$$\delta_1^2 = \sum_{A=0}^{M} (A - U1)^2 \times \frac{P(A)}{W1}, \quad \delta_2^2 = \sum_{A=M+1}^{255} (A - U2)^2 \times \frac{P(A)}{W2},$$

wherein "$\delta_1^2$" denotes a variance of all pixels in the pixel set C1, "$\delta_2^2$" denotes a variance of all pixels in the pixel set C2.

$\delta_W^2 = W1 \times \delta_1^2 + W2 \times \delta_2^2$, wherein "$\delta_W^2$" denotes a variance sum of all pixels in the pixel set C1 and the pixel set C2.

According to the above-mentioned formulas, the image processing system 10 may configure different values to M one by one, and utilize configured values of M to calculate a plurality of variance sums. Each of the configured values may corresponds to a calculated variance sum, and each of the configured values is a positive integer ranged from 0 to 255. A configured value of M is the binarization threshold value of the pixel with gray value "A" in a R*R rank pixel array, when the configured value corresponds to a minimum variance sum in the plurality of calculated variance sums.

Figure 3:
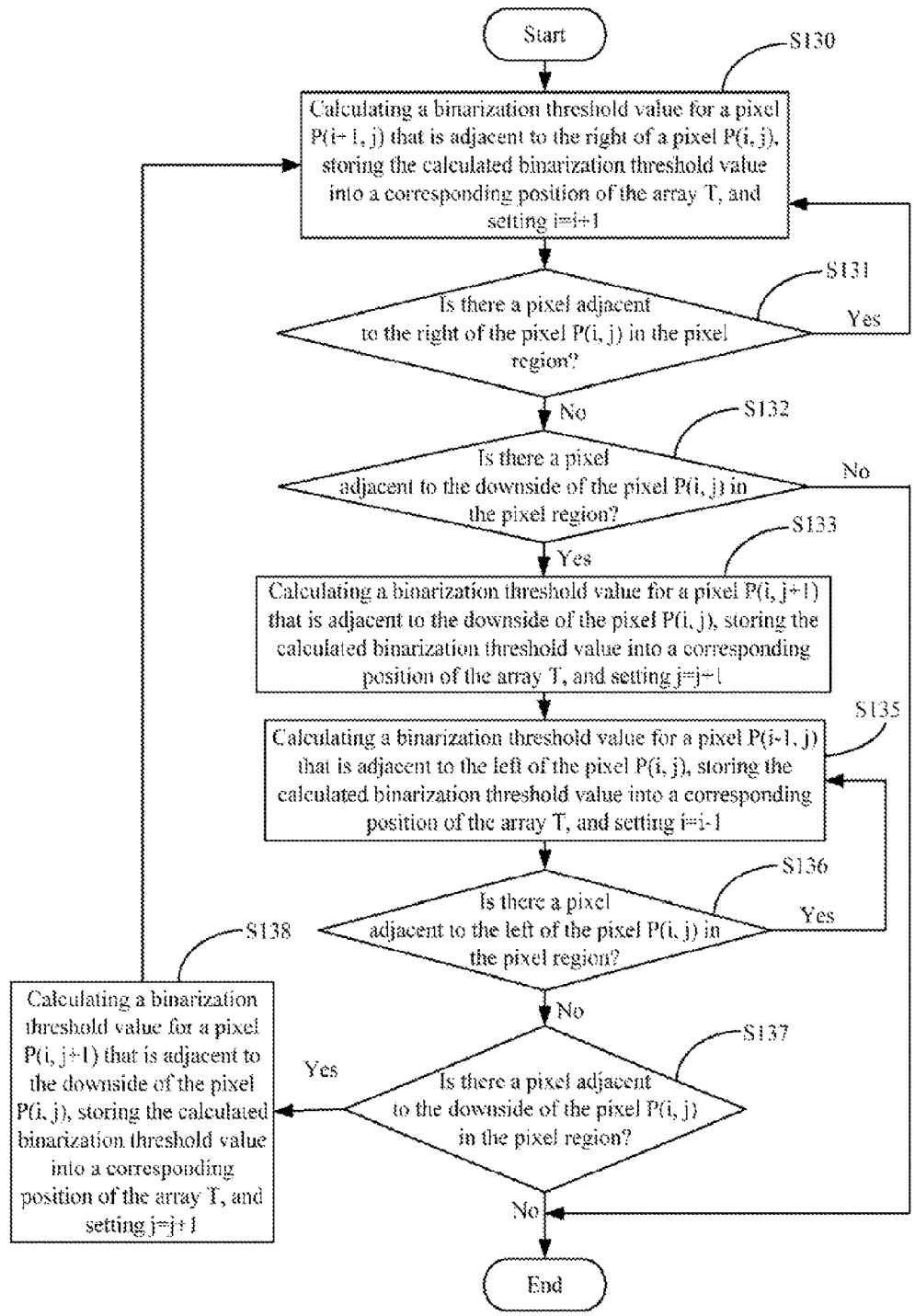
FIG. 3 is a flowchart illustrating one embodiment of a step S13 of FIG. 2.

In block S13, the image processing system 10 one by one calculates a binarization threshold value for each pixel in the pixel region by utilizing adjacency relations of pixels in the pixel region. For example, as shown in FIG. 4, P(3, 2) is adjacent to the right of P(2, 2), P(2, 3) is adjacent to the left of P(3, 3), P(4, 3) is adjacent to the downside of P(4, 2). The details of utilizing adjacency relations of pixels in the pixel region, is shown in FIG. 3 described below, for example. The image processing system 10 further stores each calculated binarization threshold value into a corresponding position of the array T. The details of the block S13, is shown in FIG. 3 described below, for example.

In block S15, the image processing system 10 assigns a binarization threshold value to each pixel outside the pixel region, and stores each assigned binarization threshold value into a corresponding position of the array T. In one embodiment, if a pixel X outside the pixel region is adjacent to a pixel Y inside the pixel region, the binarization threshold value of the pixel Y may be assigned to the pixel X. For example, as shown in FIG. 4, P(1, 2) outside the pixel region is adjacent to P(2, 2) inside the pixel region, the binarization threshold value of P(2, 2) may be assigned to P(1, 2).

In block S16, the image processing system 10 binarizes the gray-scale image according to the binarization threshold values in the array T, to generate a corresponding binary image. The image processing system 10 further stores the generated binary image into the mass storage device 13.

FIG. 3 is a flowchart illustrating one embodiment of the step S13. Depending on the embodiment, additional blocks in the flow of FIG. 2 may be added, others removed, and the ordering of the blocks may be changed. At the beginning of the step S13, the initial pixel determined in block S12 that is described above, is set as the current pixel P(i, j) to be calculated for a binarization threshold value.

In block S130, the image processing system 10 calculates a binarization threshold value for a pixel P(i+1, j) that is adjacent to the right of the pixel P(i, j). The image processing system 10 further stores the calculated binarization threshold value into a corresponding position of the array T, and sets i=i+1. The details of the method of calculating a binarization threshold value for a pixel is described above.

In block S131, the image processing system 10 determines whether a pixel adjacent to the right of the pixel P(i, j) is in the pixel region.

If the pixel adjacent to the right of the pixel P(i, j) is in the pixel region, then the procedure goes to block S130 described above. Otherwise, if the pixel adjacent to the right of the pixel P(i, j) is not in the pixel region, then the procedure goes to block S132 described below.

In block S132, the image processing system 10 determines whether a pixel adjacent to the downside of the pixel P(i, j) is in the pixel region.

If the pixel adjacent to the downside of the pixel P(i, j) is in the pixel region, then the procedure goes to block S133 described below. Otherwise, if the pixel adjacent to the downside of the pixel P(i, j) is not in the pixel region, then the procedure ends.

In block S133, the image processing system 10 calculates a binarization threshold value for a pixel P(i, j+1) that is adjacent to the downside of the pixel P(i, j). The image processing system 10 further stores the calculated binarization threshold value into a corresponding position of the array T, and sets j=j+1.

In block S135, the image processing system 10 calculates a binarization threshold value for a pixel P(i−1, j) that is adjacent to the left of the pixel P(i, j). The image processing system 10 further stores the calculated binarization threshold value into a corresponding position of the array T, and sets i=i−1.

In block S136, the image processing system 10 determines whether a pixel adjacent to the left of the pixel P(i, j) is in the pixel region.

If the pixel adjacent to the left of the pixel P(i, j) is in the pixel region, then the procedure goes to block S135 described above. Otherwise, if the pixel adjacent to the left of the pixel P(i, j) is not in the pixel region, then the procedure goes to block S137 described below.

In block S136, the image processing system 10 determines whether a pixel adjacent to the downside of the pixel P(i, j) is in the pixel region.

If the pixel adjacent to the downside of the pixel P(i, j) is in the pixel region, then the procedure goes to block S138 described below. Otherwise, if the pixel adjacent to the downside of the pixel P(i, j) is not in the pixel region, then the procedure ends.

In block S138, the image processing system 10 calculates a binarization threshold value for a pixel P(i, j+1) that is adjacent to the downside of the pixel P(i, j). The image processing system 10 further stores the calculated binarization threshold value into a corresponding position of the array T, and sets j=j+1. Then the procedure goes to block S130 described above.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   at least one storage system and at least one processor; and
   an image binarizing system stored in the at least one storage system, and being executable by the at least one processor to perform steps of:
   (a) receiving a gray-scale image from the at least one storage system, and generating a binarization array according to how many pixels in length of the gray-scale image and how many pixels in width of the gray-scale image;
   (b) setting a binarization parameter, and determining a pixel region of the gray-scale image according to the binarization parameter, wherein each pixel in the pixel region needs to be calculated for a binarization threshold value;
   (c) determining an initial pixel according to the binarization parameter, calculating a binarization threshold value for the initial pixel, and storing the calculated binarization threshold value into a corresponding position of the binarization array;
   (d) calculating a binarization threshold value for each pixel in the pixel region by utilizing adjacency relations of pixels in the pixel region, and storing each calculated binarization threshold value into a corresponding position of the binarization array;
   (e) assigning a binarization threshold value to each pixel outside the pixel region, and storing each assigned binarization threshold value into a corresponding position of the binarization array;
   (f) binarizing the gray-scale image according to the binarization threshold values in the binarization array, to generate a corresponding binary image, and storing the generated binary image into the at least one storage system.

2. The electronic device as described in claim 1, wherein the electronic device is selected from the group consisting of a computer, a server, and a mobile phone.

3. The electronic device as described in claim 1, wherein the pixel region comprises pixels that each is a center pixel of a pixel array defined by the binarization parameter.

4. The electronic device as described in claim 1, wherein each pixel of the gray-scale image corresponds to a position of the binarization array.

5. The electronic device as described in claim 1, wherein the step (d) further comprises:
   (d1) calculating a binarization threshold value for a pixel adjacent to the right of a current pixel by utilizing the adjacency relations, and identifying the pixel as the current pixel;
   (d2) repeatedly performing the step (d1) until a pixel adjacent to the right of the current pixel is not in the pixel region;
   (d3) calculating a binarization threshold value for a pixel adjacent to the under-side of the current pixel by utilizing adjacency relations, if the pixel is in the pixel region, and identifying the pixel as the current pixel;
   (d4) calculating a binarization threshold value for a pixel adjacent to the left of a current pixel by utilizing adjacency relations, and identifying the pixel as the current pixel;
   (d5) repeatedly performing the step (d4) until a pixel adjacent to the left of the current pixel is not in the pixel region;
   (d6) calculating a binarization threshold value for a pixel adjacent to the under-side of the current pixel by utilizing adjacency relations, if the pixel is in the pixel region, and identifying the pixel as the current pixel;
   (d7) repeatedly performing the steps (d1)-(d6) until each pixel in the pixel region is calculated with a binarization threshold value.

6. A computer-implemented method for binarizing a gray-scale image in an electronic device, the method comprising:
   (a) receiving a gray-scale image from at least one storage system of the electronic device, and generating a binarization array according to how many pixels in length of the gray-scale image and how many pixels in width of the gray-scale image;
   (b) setting a binarization parameter, and determining a pixel region of the gray-scale image according to the binarization parameter, wherein each pixel in the pixel region needs to be calculated for a binarization threshold value;
   (c) determining an initial pixel according to the binarization parameter, calculating a binarization threshold value for the initial pixel, and storing the calculated binarization threshold value into a corresponding position of the binarization array;
   (d) calculating a binarization threshold value for each pixel in the pixel region by utilizing adjacency relations of pixels in the pixel region, and storing each calculated binarization threshold value into a corresponding position of the binarization array;

(e) assigning a binarization threshold value to each pixel outside the pixel region, and storing each assigned binarization threshold value into a corresponding position of the binarization array;

(f) binarizing the gray-scale image according to the binarization threshold values in the binarization array, to generate a corresponding binary image, and storing the generated binary image into the at least one storage system.

7. The method as described in claim 6, wherein the electronic device is selected from the group consisting of a computer, a server, and a mobile phone.

8. The method as described in claim 6, wherein the pixel region comprises pixels that each is a center pixel of a pixel array defined by the binarization parameter.

9. The method as described in claim 6, wherein each pixel of the gray-scale image corresponds to a position of the binarization array.

10. The method as described in claim 6, wherein the step (d) further comprises:
 (d1) calculating a binarization threshold value for a pixel adjacent to the right of a current pixel by utilizing the adjacency relations, and identifying the pixel as the current pixel;
 (d2) repeatedly performing the step (d1) until a pixel adjacent to the right of the current pixel is not in the pixel region;
 (d3) calculating a binarization threshold value for a pixel adjacent to the under-side of the current pixel by utilizing adjacency relations, if the pixel is in the pixel region, and identifying the pixel as the current pixel;
 (d4) calculating a binarization threshold value for a pixel adjacent to the left of a current pixel by utilizing adjacency relations, and identifying the pixel as the current pixel;
 (d5) repeatedly performing the step (d4) until a pixel adjacent to the left of the current pixel is not in the pixel region;
 (d6) calculating a binarization threshold value for a pixel adjacent to the under-side of the current pixel by utilizing adjacency relations, if the pixel is in the pixel region, and identifying the pixel as the current pixel;
 (d7) repeatedly performing the steps (d1)-(d6) until each pixel in the pixel region is calculated with a binarization threshold value.

11. A non-transitory storage medium having stored thereon instructions that, when executed by a processor of an electronic device, causing the electronic device to perform a method for binarizing a gray-scale image, wherein the method comprises:
 (a) receiving a gray-scale image from at least one storage system of the electronic device, and generating a binarization array according to how many pixels in length of the gray-scale image and how many pixels in width of the gray-scale image;
 (b) setting a binarization parameter, and determining a pixel region of the gray-scale image according to the binarization parameter, wherein each pixel in the pixel region needs to be calculated for a binarization threshold value;
 (c) determining an initial pixel according to the binarization parameter, calculating a binarization threshold value for the initial pixel, and storing the calculated binarization threshold value into a corresponding position of the binarization array;
 (d) calculating a binarization threshold value for each pixel in the pixel region by utilizing adjacency relations of pixels in the pixel region, and storing each calculated binarization threshold value into a corresponding position of the binarization array;
 (e) assigning a binarization threshold value to each pixel outside the pixel region, and storing each assigned binarization threshold value into a corresponding position of the binarization array;
 (f) binarizing the gray-scale image according to the binarization threshold values in the binarization array, to generate a corresponding binary image, and storing the generated binary image into the at least one storage system.

12. The non-transitory storage medium as described in claim 11, wherein the electronic device is selected from the group consisting of a computer, a server, and a mobile phone.

13. The non-transitory storage medium as described in claim 11, wherein the pixel region comprises pixels that each is a center pixel of a pixel array defined by the binarization parameter.

14. The non-transitory storage medium as described in claim 11, wherein each pixel of the gray-scale image corresponds to a position of the binarization array.

15. The non-transitory storage medium as described in claim 11, wherein the step (d) further comprises:
 (d1) calculating a binarization threshold value for a pixel adjacent to the right of a current pixel by utilizing the adjacency relations, and identifying the pixel as the current pixel;
 (d2) repeatedly performing the step (d1) until a pixel adjacent to the right of the current pixel is not in the pixel region;
 (d3) calculating a binarization threshold value for a pixel adjacent to the under-side of the current pixel by utilizing adjacency relations, if the pixel is in the pixel region, and identifying the pixel as the current pixel;
 (d4) calculating a binarization threshold value for a pixel adjacent to the left of a current pixel by utilizing adjacency relations, and identifying the pixel as the current pixel;
 (d5) repeatedly performing the step (d4) until a pixel adjacent to the left of the current pixel is not in the pixel region;
 (d6) calculating a binarization threshold value for a pixel adjacent to the under-side of the current pixel by utilizing adjacency relations, if the pixel is in the pixel region, and identifying the pixel as the current pixel;
 (d7) repeatedly performing the steps (d1)-(d6) until each pixel in the pixel region is calculated with a binarization threshold value.

* * * * *